United States Patent [19]

Osborne

[11] 4,416,356
[45] Nov. 22, 1983

[54] HYDRAULIC WHEEL CYLINDER ASSEMBLIES AND DRUM BRAKES INCORPORATING SAME

[75] Inventor: Duncan W. Osborne, Leamington Spa, England

[73] Assignee: Automotive Products Limited, Leamington Spa, England

[21] Appl. No.: 302,530

[22] Filed: Sep. 16, 1981

[30]  Foreign Application Priority Data

Sep. 27, 1980 [GB] United Kingdom ................ 8031307

[51] Int. Cl.³ ............................................. F16D 65/24
[52] U.S. Cl. ......................... 188/326; 188/79.5 GE; 188/106 A; 188/106 F; 188/196 BA; 188/343; 188/364
[58] Field of Search ................ 188/325, 326, 331–333, 188/342, 343, 79.5 R, 79.5 GE, 79.5 GC, 79.5 GT, 79.5 P, 363–364, 196 BA, 196 B, 196 D, 106 F, 106 A

[56]  References Cited

U.S. PATENT DOCUMENTS

| 3,977,500 | 8/1976 | Farr ................................. 188/326 X |
| 4,013,150 | 3/1977 | Crabtree ............................ 188/326 |
| 4,380,277 | 4/1983 | Ingram et al. ............ 188/196 BA X |

*Primary Examiner*—Douglas C. Butler
*Attorney, Agent, or Firm*—Kemon & Estabrook

[57]  ABSTRACT

A hydraulic wheel cylinder assembly is particularly for use in a drum brake of the kind in which the wheel cylinder assembly is interposed between one pair or adjacent ends of a pair of brake shoes and a mechanical expander and fixed abutment is interposed between the other pair of adjacent ends of the shoes. The wheel cylinder assembly incorporates a pair of piston assemblies each including an adjustable variable length tappet assembly comprising rotatable and un-rotatable screwthreaded components. The rotatable screwthreaded component can move axially relative to the driven member of a one-way drive mechanism by compression of a spring when a flange on the driven member strikes the wheel cylinder body. This provides a self-centering force which prevents drag when the brake is installed with the shoes one above the other.

12 Claims, 4 Drawing Figures

HYDRAULIC WHEEL CYLINDER ASSEMBLIES AND DRUM BRAKES INCORPORATING SAME

The invention relates to hydraulic wheel cylinder assemblies and internal shoe drum brakes, particularly brakes of the kind in which the wheel cylinder assembly is interposed between one pair of adjacent ends of a pair of brake shoes and acts as a spacing strut for said ends and a mechanical expander and fixed abutment means are interposed between the other pair of adjacent ends of the shoes.

A drum brake of the kind referred to is described in British Patent Specification No. 1,513,740. It has leading-and-training shoe performance in the hydraulic actuating mode, giving stable and consistent performance in both directions of drum rotation, with duo-servo shoe performance in the mechanical mode, giving a high torque restraint in both directions for parking purposes. However, whilst the wheel cylinder assembly shown in this patent specification performs satisfactorily it has a disadvantage concerning the installation of the brake on a motor vehicle. Space and other restraints sometimes require the brake to be mounted with the shoes disposed either side of the horizontal centreline. In this arrangement the weight of the shoes tends to cause the wheel cylinder pistons and the shoes to fall under the combined effects of vibration and gravity, despite the presence of friction created by the shoe hold-down springs, and so cause brake drag.

According to one aspect of the invention there is provided a hydraulic wheel cylinder assembly for an internal shoe drum brake, the wheel cylinder assembly comprising a cylinder body having a through bore therein, a pair of piston assemblies slidable in said bore and an inlet port in the body which opens into the bore for supplying hydraulic pressure to urge the piston assemblies away from each other, each piston assembly having an automatically adjustable variable length tappet assembly for transmitting a thrust to an adjacent brake shoe and comprising a rotatable screw-threaded component interengaged with a non-rotatable screw-threaded component and a one-way drive mechanism associated with each tappet assembly to effect rotation of the rotatable screw-threaded component in the direction to increase the length of the tappet assembly in response to excessive movement of the respective piston assembly in the bore, the one-way drive mechanism including a driven member which is rotationally fast with the rotatable screw-threaded component but axially movably relative thereto against a spring, the driven member comprising stop means for limiting movement of the driven member in the direction of the other piston assembly and the spring being arranged to yield during continuing movement of the screw-threaded components in said direction.

According to another aspect of the invention there is provided an internal shoe drum brake comprising a hydraulic wheel cylinder assembly interposed between one pair of adjacent ends of a pair of brake shoes and a mechanical expander and fixed abutment means interposed between the other pair of adjacent ends of the shoes, wherein the wheel cylinder assembly is a wheel cylinder assembly according to said one aspect of the invention.

One embodiment of the invention will now be described by way of example and with reference to the accompanying drawings, of which:

Figure 1:
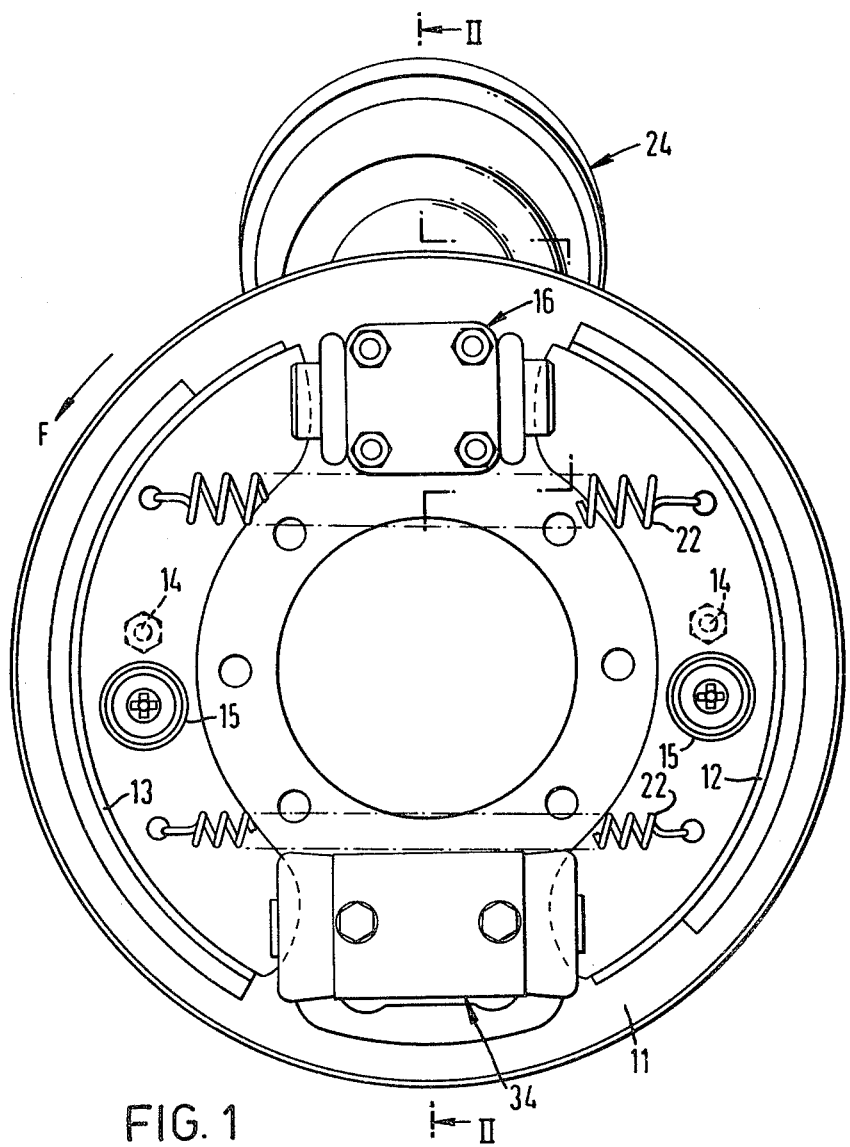
FIG. 1 is an elevation of an internal shoe drum brake assembly incorporating a hydraulic wheel cylinder assembly according to the invention.
Figure 2:
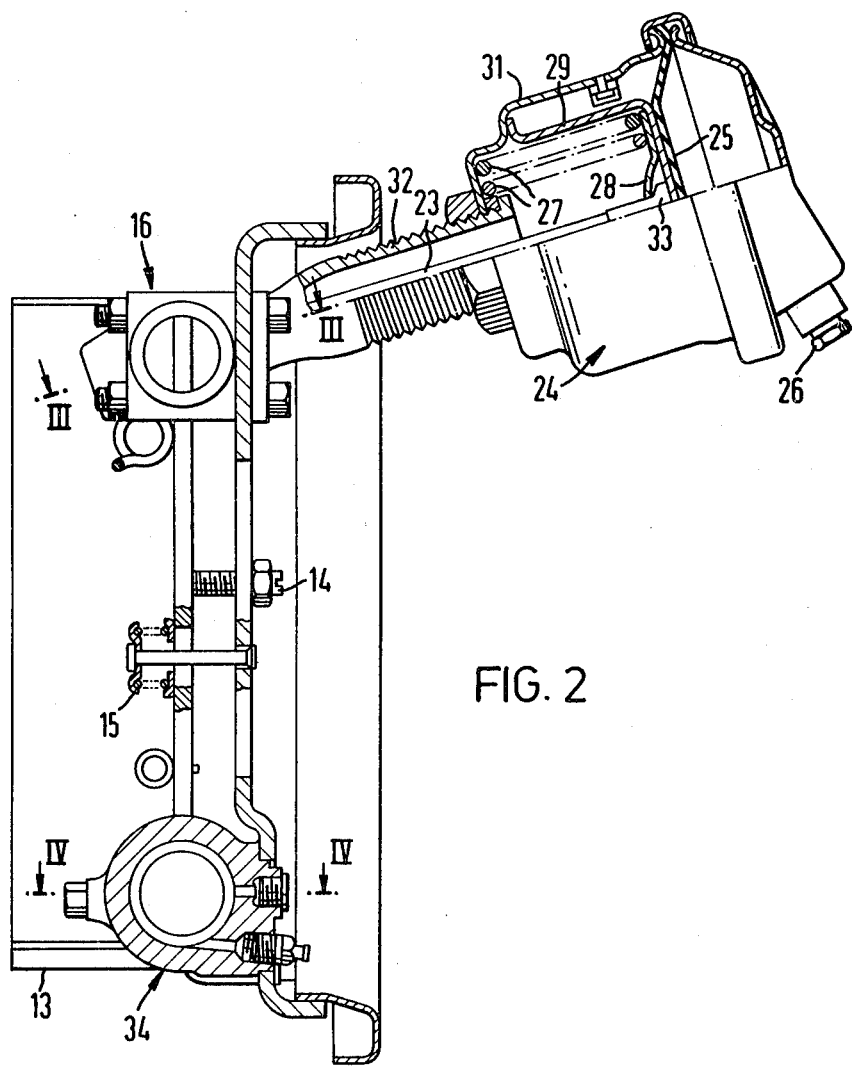
FIG. 2 is a cross-sectional elevation on the line II—II in FIG. 1.

The drum brake shown in the drawings includes a backplate 11 and a pair of brake shoes 12 and 13 spaced slightly from the backplate by adjustable steady pins 14. The usual hold down spring assemblies 15 are provided.

Figure 3:
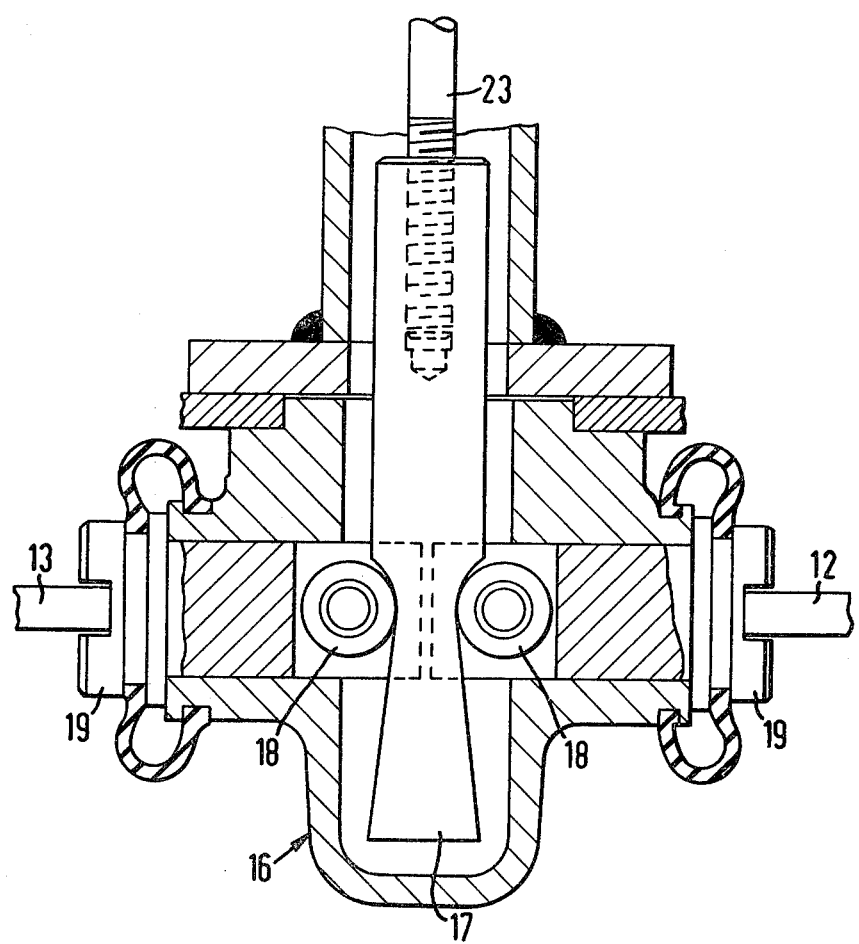
FIG. 3 is a cross-section on the line III—III in FIG. 2 drawn to a larger scale.

Between one pair of adjacent ends of the brake shoes 12 and 13 there is a mechanical expander 16 (FIG. 3) which comprises a wedge 17 operating between rollers 18 carried by tappets 19. The tappets are a sliding fit in the expander body 21 and each has a head which provides an abutting shoulder with the body 21 to react the load of the usual pull-off springs 22 and also brake drag loads as will be described later.

The wedge 17 is connected to a pull-rod 23 of a spring actuator assembly 24. A diaphragm 25 subject to air pressure at port 26 normally keeps the expander 16 in the inoperative state shown in FIG. 3 against the load of coil springs 27 which act through a dished plate 28 against a cup-shaped plate 29. The springs 27 react against a housing 31 which is retained on a support tube 32. When the air pressure at port 26 is released the springs 27 act through plate 28 onto a head 33 on the pull-rod 23, pulling the wedge 17 to urge the tappets 19 apart.

Figure 4:
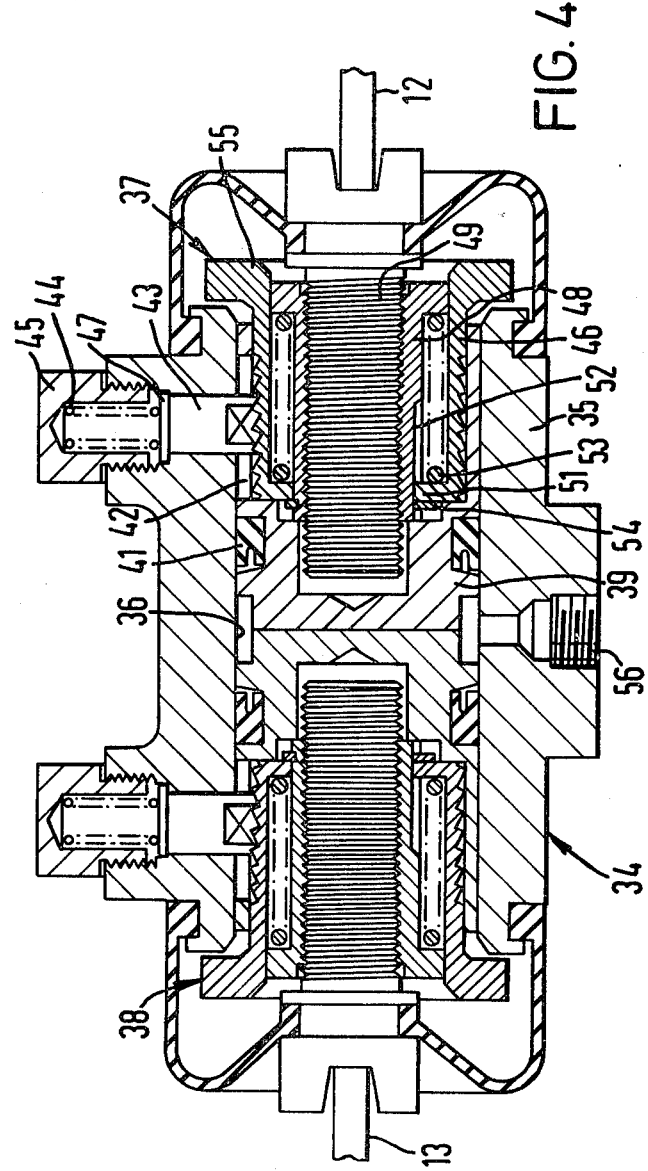
FIG. 4 is a cross-section on the line IV—IV in FIG. 2 drawn to the same scale as FIG. 3.

A hydraulic wheel cylinder assembly 34 according to the invention is between the other pair of adjacent ends of the brake shoes 12 and 13, being shown in more detail in FIG. 4. It comprises a cylinder body 35 having a through bore 36 in which are slidable a pair of piston assemblies 37 and 38. Since the piston assemblies are identical, only one, 37, will be described in detail.

Piston assembly 37 includes a piston body 39 which has a groove for a rubber seal 41 and a slot 42 which engages two flats on a generally cylindrical pawl peg 43. A coil spring 44 retained by a screw cap 45 biasses the pawl peg 43 into engagement with helical ratchet teeth on a sleeve component 46 which is receive in a bore in the piston body 39. These ratchet teeth are in the form of a multi-start fine pitch buttress screw thread and the teeth on the pawl peg 43 have a similar form. The pawl peg 43 has a circular head 47 which is received in the base of the threaded recess for the screw cap 45 and which is eccentric to the axis of the cylindrical portion to ensure correct assembly.

A screw threaded nut component 48 is a sliding fit within sleeve component 46, being interengaged with a screw-threaded tappet 49 which is non-rotatable by virtue of engagement of the adjacent end of brake shoe 12 in a slot in the head of the tappet. The sleeve member 46 is rotationally fast with the nut component 48 by virtue of dog teeth formed on an inwardly directed flange 51, the teeth engaging in longitudinal grooves 52 in the nut component 48. A coil spring 53 biasses the flange 51 into engagement with a snap-ring or circlip 54 held in a groove in the nut component 48.

As shown in FIG. 4 the piston assemblies 37 and 38 are in abutment with each other, being biassed by the pull-off springs 22, and there is a small clearance between the end face of the cylinder body 35 and radial flange 55 on the sleeve component 46. This flange 55 co-operates with the adjacent end face of the cylinder 35 to act as stop means for limiting movement of the sleeve component in the direction of piston assembly 38. An inlet port 56 is provided for supplying hydraulic pressure under the control of the driver of a vehicle to which the brake is fitted.

When installed on a vehicle the brake is normally fitted with the axis of the wheel cylinder 34 vertical, so that the brake shoes 12 and 13 are in fact disposed either side of the horizontal centre line of FIG. 1 if the drawing is rotated through 90°. For service braking hydraulic pressure is supplied to inlet port 56 of the wheel cylinder 34 to move the piston assemblies 37 and 38 away from each other to apply brake shoes 12 and 13 to an associated brake drum (not shown). The expander body 16 reacts the shoe tip loads on the heads of tappets 19 as previously described so that the brake functions as a leading-and-trailing shoe brake for both directions of drum rotation.

For parking, or in emergencies, air is released from port 26 in the spring actuator 24 to allow springs 27 to act on the wedge 17. For forwards drum rotation, as indicated by arrow F (FIG. 1), only the tappet 19 acting on shoe 13 moves under the wedging action, the other tappet 19 acting on shoe 12 having to react a greater load than is applied by the wedge 17. This is because the piston assembly 38 transmits the drag load from the trailing end of shoe 13 to piston assembly 37 which applies the load to the leading end of shoe 12 in a manner typical of a duo-servo brake. For reverse brake drum rotation the tappet 19 acting on shoe 12 moves and the tappet acting on shoe 13 provides the reaction.

During reverse-rotation duo-servo operation of the brake, the drag forces of shoe 12 act on tappet assembly 37 to move tappet assembly 38 to apply shoe 13, i.e. towards the left of FIG. 4. However, the sleeve component 46 is restrained by flange 55 so that spring 53 is compressed during such movement.

Spring 53 is preloaded to form a spring connection between the sleeve component 46 and the nut component 48 which allows relative axial movement in one direction such that the nut component 48 can move in the direction of the piston assembly 38 when the sleeve component is arrested by flange 55 striking the cylinder body 35. This serves two purposes. When the brake is installed as described above and, for example, brake shoe 12 is uppermost, then flange 55 contacts the end face of the cylinder body and spring 53 acts on the nut component 48 and tappet 49 to help support the weight of shoe 12 and, by the tension of the pull-off springs 22, supports shoe 13 also. The shoes 12 and 13 are also supported by friction created by the hold-down spring assemblies 15.

The other purpose of spring 53 is in connection with the automatic adjustment of the variable length tappet assembly which comprises the tappet 49 and nut component 48. A one-way drive mechanism includes the sleeve component 46 acting as the driven member and the pawl peg 43 acting as the driving member, the ratchet teeth on the sleeve component 46 and the pawl teeth on the pawl peg 43 being arranged so that when the piston assembly 37 is moved to the right of FIG. 4, e.g. on hydraulic operation of the wheel cylinder, the pawl teeth ride up the ratchet teeth. If the shoe to drum clearance is small then the crests of the ratchet teeth will not reach the crests of the pawl teeth and the parts return to their original positions when hydraulic pressure is released. If, however, the clearance is excessive then the ratchet teeth will ride over the crests of the pawl teeth. When the piston assembly returns, the pawl teeth act on the ratchet teeth to tend to turn the sleeve component 46 (and thus the nut component 48) in the direction to move the tappet 49 outwards and thus increase the length of the assembly. The spring 53 acts to absorb the release movement of the shoe 12 by becoming compressed while the tappet 49, nut component 48 and piston body 39 continue to return to their positions as shown in FIG. 4 if the friction in the screw-threads of the nut component 48 and the tappet should be too high and so prevent turning. This is particularly likely when the brake is applied hydraulically when coming to a halt on an upwards slope and the spring actuator 24 is brought into action for parking, since the torque reaction of the brake is reversed whilst in the duo-servo mode. This means that the load transmitted by the piston assemblies 37 and 38 remains high because one piston assembly 37 has to move from one extreme of travel in which it applies shoe 12 as a leading shoe to the other extreme in which it reacts the drag load of shoe 12 and acts on the other assembly 38 to apply shoe 13.

I claim:

1. A hydraulic wheel cylinder assembly for an internal shoe drum brake, the wheel cylinder assembly comprising:
   a cylinder body having a through bore therein;
   a pair of piston assemblies slidable in said bore;
   an inlet port in the cylinder body which opens into said bore for supplying hydraulic pressure to urge the piston assemblies away from each other;
   an automatically adjustable variable length tappet assembly incorporated in each piston assembly, each tappet assembly comprising a rotatable screw-threaded component interengaged with a non-rotatable screw-threaded component;
   a one-way drive mechanism associated with each tappet assembly and comprising a driven member which is rotationally fast with the rotatable screw-threaded component and a driving member which is rotationally fast with the cylinder body;
   a spring connection between the driven member and the rotatable screw-threaded component allowing relative axial movement therewith;
   and stop means on the driven member for limiting movement of the driven member in the direction of the other piston assembly, the arrangement being such that the spring connection yields during continuing movement of the screw-threaded components in the direction of the other piston assembly when the driven member is arrested by said stop means.

2. The wheel cylinder assembly of claim 1, wherein said stop means comprises a flange for contacting the cylinder body.

3. The wheel cylinder assembly of claim 1, wherein said spring connection comprises a compression spring and an inwardly directed flange on the driven member, said spring acting between the rotatable screw-threaded component and the inwardly-directed flange.

4. The wheel cylinder assembly of claim 3, wherein the inwardly directed flange has dog teeth and the rotatable screw-threaded component has grooves into which the dog teeth are engaged.

5. The wheel cylinder assembly of claim 1, wherein each piston assembly further comprises a piston body slidable in the through bore, the piston body defining a bore and the driven member comprising a sleeve component which is slidable over the rotatable screw-threaded component and is slidable in the bore in the piston body.

6. The wheel cylinder assembly of claim 5, wherein the driving member of the one-way drive mechanism comprises a spring-loaded pawl having pawl teeth and the sleeve component comprises helical ratchet teeth co-operating with the pawl teeth, the piston body defining a slot through which the pawl extends.

7. An internal shoe drum brake comprising a pair of brake shoes, a hydraulic wheel cylinder assembly interposed between one pair of adjacent ends of the shoes and a mechanical expander and fixed abutment means interposed between the other pair of adjacent ends of the shoes, the hydraulic wheel cylinder assembly comprising:
- a cylinder body having a through bore therein;
- a pair of piston assemblies slidable in said bore;
- an inlet port in the cylinder body which opens into said bore for supplying hydraulic pressure to urge the piston assemblies away from each other;
- an automatically adjustable variable length tappet assembly incorporated in each piston assembly, each tappet assembly comprising a rotatable screw-threaded component interengaged with a non-rotatable screw-threaded component;
- a one-way drive mechanism associated with each tappet assembly and comprising a driven member which is rotationally fast with the rotatable screw-threaded component and a driving member which is rotationally fast with the cylinder body;
- a spring connection between the driven member and the rotatable screw-threaded component allowing relative axial movement therewith;
- and stop means on the driven member for limiting movement of the driven member in the direction of the other piston assembly, the arrangement being such that the spring connection yields during continuing movement of the screw-threaded components in the direction of the other piston assembly when the driven member is arrested by said stop means.

8. The brake of claim 7, wherein said stop means comprises a flange for contacting the cylinder body.

9. The brake of claim 7, wherein said spring connection comprises a compression spring and an inwardly directed flange on the driven member, said spring acting between the rotatable screw-threaded component and the inwardly-directed flange.

10. The brake of claim 9, wherein the inwardly directed flange has dog teeth and the rotatable screw-threaded component has grooves into which the dog teeth are engaged.

11. The brake of claim 7, wherein each piston assembly further comprises a piston body slidable in the through bore, the piston body defining a bore and the driven member comprising a sleeve component which is slidable over the rotatable screw-threaded component and is slidable in the bore in the piston body.

12. The brake of claim 11, wherein the driving member of the one-way drive mechanism comprises a spring-loaded pawl having pawl teeth and the sleeve component comprises helical ratchet teeth co-operating with the pawl teeth, the piston body defining a slot through which the pawl extends.

* * * * *